UNITED STATES PATENT OFFICE.

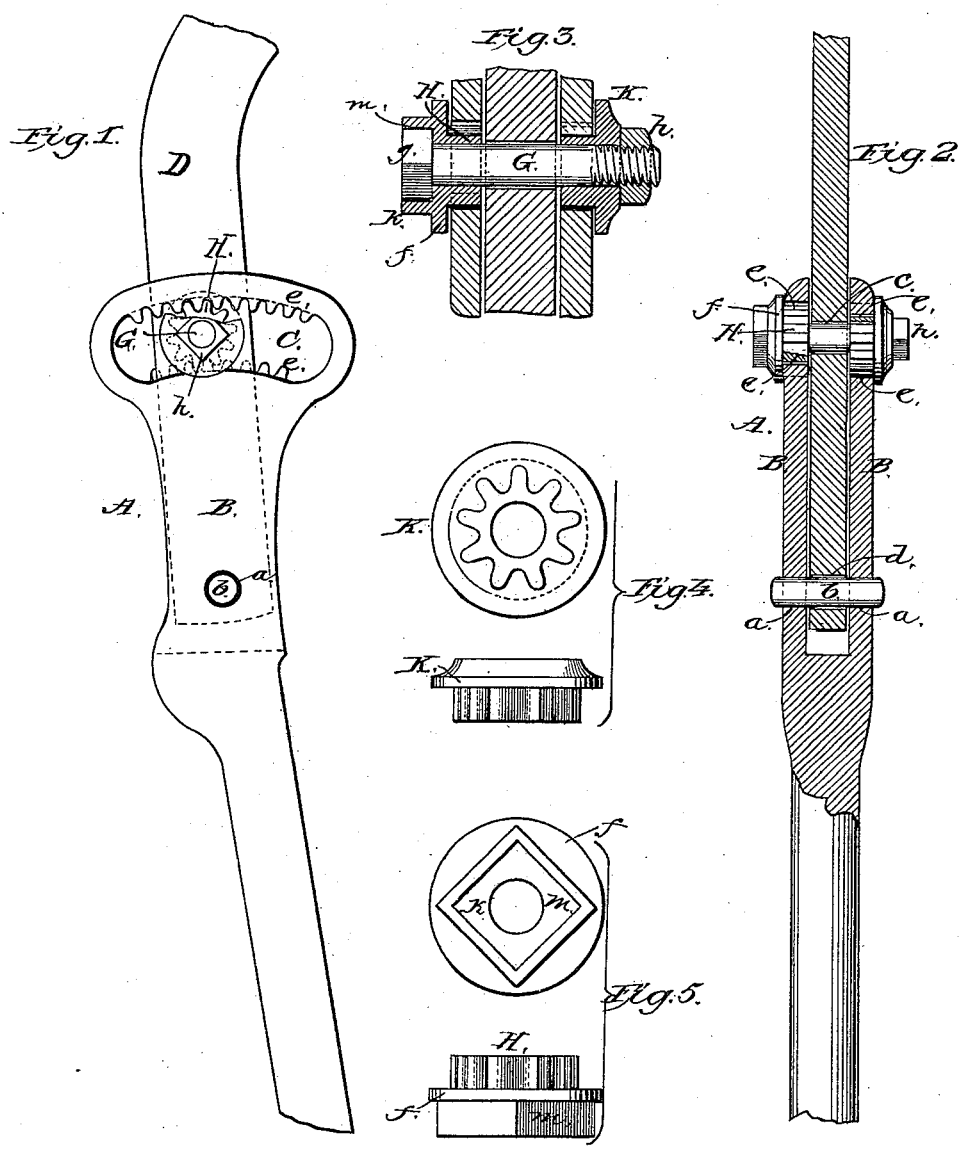

FRANK B. MANLY, OF MALTA, OHIO.

PLOW-STANDARD.

SPECIFICATION forming part of Letters Patent No. 246,169, dated August 23, 1881.

Application filed May 14, 1881. (No model.)

*To all whom it may concern:*

Be it known that I, FRANK B. MANLY, of Malta, in the county of Morgan and State of Ohio, have invented a new and valuable Improvement in Plow-Standards; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of the device. Fig. 2 is a transverse section. Fig. 3 is an enlarged detail section. Figs. 4 and 5 are details.

This invention has relation to adjustable shovel-standards; and it consists in the combination, with the standard and beam, of a curved rack-and-pinion connection; also, in the construction and novel arrangement of the flanged and recessed pinions designed to operate in connection with a square-headed clamping-bolt, as hereinafter shown and described.

In the accompanying drawings, the letter A designates the upper portion of a plow-standard, which is provided with the lateral branches B. Arc-shaped slots C are made in the broad portions of these branches, and pivot-holes $a$ for the center bolt or break-pin, $b$, from which the curvature of the slots C is determined.

D represents the beam or beam-section, which is provided with bolt-holes $c$ and $d$, which are separated from each other by a distance equal to the radius of curvature of said slots C. In these curved slots are the racks or teeth $e$, which are preferably formed on the upper edge of the slot in one branch, and on the lower edge of the slot in the other, so as to have a checking action with reference to each other on the pinions; but this construction may be varied, the object being principally to provide a curved rack for the engagement of the pinion.

G indicates the clamping-bolt, which is provided with one or more pinions and a nut, $h$. Usually I prefer to employ a square-headed bolt, the head $g$ of which is designed to fit within a square recess, $m$, in the outer portion of a pinion, H, said outer portion consisting of a flange-bearing, $f$, and a key-seat, $k$. The body of the bolt passes through the arc slot or slots and the beam-section, and receives on its threaded end the flanged pinion K and the nut $h$. After the adjustment of the standard the nut $h$ is screwed home, holding the pinions and their flanges in firm connection with the slotted branches of the standard.

The object of this invention is to enable the plowman readily to give the shovel the pitch desired, so that it may be made to stand perpendicular or at a desired angle.

Having described this invention, what I claim, and desire to secure by Letters Patent, is—

1. In combination with a plow beam and standard pivoted together, the rack and pinion devices for adjustment, substantially as specified.

2. The rack branch or branches of the standard, in combination with a clamp bolt and nut, and the pinions respectively connected with the head and threaded end of said clamp-bolt, substantially as specified.

In testimony that I claim the above I have hereunto subscribed my name in the presence of two witnesses.

FRANK B. MANLY.

Witnesses:
C. F. SETTLE,
FRANK BELL.